3,194,847
PROCESS FOR THE PRODUCTION OF HALO-SUBSTITUTED OLEFINES
Clifford William Capp, Ewell, George William Godin, London, Roderick Frank Neale, Great Bookham, John Bentley Williamson, Sutton, and Brian Walton Harris, Carshalton, England, assignors to The Distillers Company Limited, Edinburgh, Scotland, a British company
No Drawing. Filed Dec. 8, 1961, Ser. No. 158,161
Claims priority, application Great Britain, Jan. 2, 1961, 97/61; Jan. 20, 1961, 2,368/61
5 Claims. (Cl. 260—656)

The present invention relates to the production of halo-substituted olefines such as vinyl chloride.

According to the present invention the process for the production of a halo-substituted olefine in which the halogen atom is attached to an ethylenically unsaturated carbon atom comprises heating an olefine under substantially anhydrous conditions with a metal halide in the presence of a polar solvent other than organic acids, alcohols, ketones and thiols, and a platinum group metal compound as catalyst.

The olefine may be a straight chain olefine containing up to six carbon atoms per molecule. Suitable olefines are ethylene, propylene or butene. Ethylene is preferred which is converted into vinyl chloride.

Suitable metal halides include the halides of metals which can exist in more than one stable valency state such as copper, mercury or silver. The preferred halides are chlorides. It is especially preferred to use cupric chloride and/or cupric bromide.

The polar solvent is preferable a high-boiling compound and suitable compounds include esters, ethers and aliphatic and aromatic chlorinated hydrocarbons. Examples of such suitable polar solvents are di-n-butyl phthalate, di-octylphthalate, benzonitrile and the di-n-butyl ether of mono ethylene glycol. The use of di-n-butyl phthalate or benzonitrile is preferred.

The platinum group metal compound catalyst may be a compound of platinum, palladium, iridium, ruthenium or rhodium. The preferred catalyst is a palladium compound. Suitable compounds may be the sulphate, nitrate acid phosphate or halide. It is particularly preferred to use palladous chloride.

The reaction is suitably carried out by intimately mixing the olefine with a reaction mixture consisting of the metal halide and catalyst in solution or suspension in the polar solvent at an elevated temperature. It is preferred to carry out the reaction at temperatures in the range of about 50° C. to 300° C. It is also advantageous to carry out the reaction under pressure, for instance in the range of 1 to 100 atmospheres. The reaction may be carried out continuosly or batchwise.

It has been found according to a particularly preferred embodiment of the present invention that by continuously removing the halo-substituted olefine product from the product gas mixture and recycling the residual olefine to the reaction, the rate of reaction of olefine is increased to an unexpected extent.

The halo-substituted olefine product may be recovered from the product gas mixture by fractional distillation, solvent extraction, or by absorption methods for instance using activated charcoal or preferably by cooling the gaseous mixture to condense out the halo-substituted olefine product.

The process of the invention is further illustrated by the following examples in which parts by weight bear the same relationship to parts by volume as do grammes to millilitres.

*Example 1*

In a reaction vessel which permits intimate mixing of gas and liquid, ethylene was passed into a suspension of palladous chloride (5.0 parts), cupric chloride (5.0 parts) and cupric bromide (0.5 part) in di-n-butyl phthalate (105 parts) at a temperature of 150° C. The gas withdrawn from the reaction vessel contained ethylene, vinyl chloride, ethyl chloride and hydrogen chloride. Vinyl and ethyl chlorides are removed from the gaseous product by cooling so that they are condensed. Vinyl chloride is separated from the ethyl chloride by fractional distillation. Residual ethylene together with the ethyl chloride may be recycled to the reactor. The ethyl chloride may be cracked to reform ethylene before recycle.

*Example 2*

In a reaction vessel which permitted intimate mixing of gas and liquid ethylene was passed at a rate of 23.12 parts/hour (consisting of 0.72 part fresh feed and 22.4 parts recycled ethylene) into a suspension of palladous chloride (5.0 parts), cupric chloride (5.0 parts) and cupric bromide (0.5 part) in o-dichlorobenzene (130.5 parts) at a temperature of 150° C. The gas withdrawn from the reaction vessel was cooled to about −80° to condense the vinyl chloride, and the residual ethylene was returned to the reaction vessel.

By recycling the ethylene continuously a five fold increase in reaction rate was obtained compared with batch processes.

*Example 3*

In a reaction vessel which permitted intimate mixing of gas and liquid, ethylene was passed into a suspension of 5 parts by weight of palladous chloride, 5 parts by weight of cupric chloride in 101 parts by weight of benzonitrile at 150° C. The ethylene was withdrawn from the reactor, passed through cold traps, and returned to the reactor as described in Example 2. After 5 hours, 522 parts by volume of ethylene had been absorbed. The cold trap contained benzonitrile, butenes, ethyl and vinyl chloride. The yield of vinyl chloride was 8.7% on the ethylene absorbed.

We claim:
1. A process for the production of vinyl chloride which comprises heating ethylene under substantially anhydrous conditions at a temperature of from 50 to 300° C. and at a pressure of from 1 to 100 atmospheres with a metal chloride wherein said metal is selected from the group consisting of cupric copper, mercuric mercury and silver in admixture with polar solvent selected from the group consisting or organic esters, ethers, aliphatic chlorinated hydrocarbons and aromatic chlorinated hydrocarbons, and in addition in the presence of a platinum group metal salt as a catalyst.
2. A process as claimed in claim 1 wherein the platinum group metal salt is a palladium salt.
3. A process as claimed in claim 1 wherein the palladium salt is palladous chloride.
4. Process of claim 1 wherein the polar solvent is di-n-butyl phthalate dioctylphthalate benzonitrile.
5. Process of claim 1 wherein the polar solvent is di-n-butyl ether of monoethylene glycol.

References Cited by the Examiner

UNITED STATES PATENTS 2,167,927  8/39  Groll et al. _____ 260—656
2,399,488  4/46  Hearne _____ 260—659

LEON ZITVER, *Primary Examiner.*
ALPHONSO D. SULLIVAN, *Examiner.*